(12) United States Patent
Hatano et al.

(10) Patent No.: US 9,102,095 B2
(45) Date of Patent: Aug. 11, 2015

(54) CARBON FIBER-CONTAINING RESIN SHEET CARRYING APPARATUS

(71) Applicants: NGK Insulators, Ltd., Nagoya-Shi (JP); NGK Kiln Tech, Corporation, Nagoya-Shi (JP)

(72) Inventors: Sousuke Hatano, Seto (JP); Koji Yamada, Ichinomiya (JP)

(73) Assignees: NGK Insulators, Ltd., Nagoya-Shi (JP); NGK Kiln Tech, Corporation, Nagoya-Shi (JP)

( * ) Notice: Subject to any disclaimer, the term of this patent is extended or adjusted under 35 U.S.C. 154(b) by 278 days.

(21) Appl. No.: 13/650,599

(22) Filed: Oct. 12, 2012

(65) Prior Publication Data

US 2013/0098560 A1    Apr. 25, 2013

(30) Foreign Application Priority Data

Oct. 21, 2011  (JP) ................. 2011-231876

(51) Int. Cl.
*B32B 37/00*   (2006.01)
*B29C 51/26*   (2006.01)
*B29C 70/56*   (2006.01)
*B29C 31/08*   (2006.01)

(52) U.S. Cl.
CPC ............. *B29C 51/262* (2013.01); *B29C 31/08* (2013.01); *B29C 70/56* (2013.01); *B29C 51/261* (2013.01)

(58) Field of Classification Search
CPC ........ B29C 31/08; B29C 51/262; B29C 70/56
USPC ............... 156/381, 538, 556, 580, 581, 583.1
See application file for complete search history.

(56) References Cited

U.S. PATENT DOCUMENTS

| | | | |
|---|---|---|---|
| 4,432,716 A | 2/1984 | Kiss | |
| 5,207,963 A | 5/1993 | Grace | |
| 6,382,953 B1* | 5/2002 | Chun et al. | 425/397 |
| 8,376,730 B2* | 2/2013 | Abeta et al. | 425/397 |
| 2009/0104300 A1 | 4/2009 | Hiroshi et al. | |

FOREIGN PATENT DOCUMENTS

| | | |
|---|---|---|
| JP | 03-207631 | 9/1991 |
| JP | 05-200850 | 8/1993 |
| JP | 08-258168 | 10/1996 |

(Continued)

OTHER PUBLICATIONS

Extended European Search Report dated Jan. 11, 2013.

(Continued)

*Primary Examiner* — James Sells
(74) *Attorney, Agent, or Firm* — Burr & Brown, PLLC (57) ABSTRACT

The carrying apparatus is a carbon fiber-containing resin sheet carrying apparatus for carrying a carbon fiber-containing resin sheet heated in a heating furnace to a pressing device, comprising a slider that moves between the heating furnace and the pressing device and a sheet holder that is mounted thereon and chucks both the end parts of the carbon fiber-containing resin sheet to apply tension. The sheet holder can have a structure such that it comprises chuck claws and a tension unit that displaces these chuck claws to the outside. The sheet holder may have a structure such that it comprises a holding metal fitting with a spring, that is arranged inside a holding frame and a chuck claw that chucks this holding frame.

5 Claims, 12 Drawing Sheets

(56) References Cited

FOREIGN PATENT DOCUMENTS

| | | |
|---|---|---|
| JP | 11-77815 | 3/1999 |
| JP | 11-292362 A1 | 10/1999 |
| JP | 2009-101564 A | 5/2009 |

OTHER PUBLICATIONS

Japanese Office Action, Japanese Application No. 2012-195175, dated Jan. 6, 2015 (3 pages).

* cited by examiner

# CARBON FIBER-CONTAINING RESIN SHEET CARRYING APPARATUS

TECHNICAL FIELD

The present invention relates to a carbon fiber-containing resin sheet carrying apparatus for use as an automobile part, airplane part and the like.

BACKGROUND ART

In response to demands for reduction in the weight of an automobile or airplane in recent years, studies have been conducted to replace metal parts with resin parts. Especially, recently, as techniques for reinforcing resin parts by use of carbon fibers progress, attempts to use a resin sheet into which carbon fibers are kneaded in a floor panel, pillar or the like of an automobile have been made.

Such a carbon fiber-containing resin sheet is preliminarily heated and softened in a heating furnace, and then press-molded into a desired shape in a pressing device. However, this heating temperature is higher than that at which a carbon fiber-containing resin sheet is drawn down, and thus the carbon fiber-containing resin sheet easily deforms in the course of carrying the resin sheet from the heating furnace to the pressing device. Such deformation easily causes misalignment of the feeding position to the pressing device, resulting in the possibility that a dimensional error may occur in a molded article.

Conventionally, structures using a sheet holding frame comprising a plurality of puncture needles, as described in JP11-292362 A, are known as those of soft sheet carrying apparatuses. However, in this case, there has been a problem that needle holes are formed in the entire circumferential edge part of a sheet, and thus that the circumferential edge part must be finally cut off, thereby causing a reduction in material yield. Especially, due to very high cost of a carbon fiber-containing resin sheet, this problem cannot be ignored.

A technique of laminating a protective film such as a polyimide film on a carbon fiber-containing resin sheet to prevent deformation during carrying has also been developed. However, in this case, the polyimide film must be removed from a product after press-molding, thereby causing an extra step. Further, there is a problem that an extra cost is required since the polyimide film is disposable.

SUMMARY OF THE INVENTION

Therefore, an object of the present invention is to provide a carbon fiber-containing resin sheet carrying apparatus which solves the above conventional problems, can carry a carbon-fiber containing resin sheet heated and softened in a heating furnace to a pressing device with high positioning accuracy, and, besides, has excellent economic efficiency.

The present invention, that has been made to solve the above problems, relates to a carbon fiber-containing resin sheet carrying apparatus that carries a carbon fiber-containing resin sheet heated in a heating furnace to a pressing device. The apparatus comprises: a slider that moves between the heating furnace and the pressing device; and a sheet holder that is mounted on this slider, and chucks both end parts of the carbon fiber-containing resin sheet to apply tension.

It is possible to employ a structure such that the sheet holder comprises: chuck claws that directly chuck both the end parts of the carbon fiber-containing resin sheet; and a tension unit that displaces these chuck claws to the outside, as recited in a second aspect of the present invention.

It is possible to employ a structure such that the sheet holder comprises a holding metal fitting with a spring, that is arranged inside a holding frame; and a chuck claw that chucks this holding frame, as recited in a third aspect of the present invention. Further, in the case where the carbon fiber-containing resin sheet is in a square shape, a structure such that the sheet holder chucks the four corners of the sheet to apply tension is preferred, as recited in a fourth aspect of the present invention.

Furthermore, it is also possible to employ a structure such that a plurality of sheet holder is provided on the slider to provide the function of laminating carbon fiber-containing resin sheets within the heating furnace, as recited in a fifth aspect of the present invention.

According to the carbon fiber-containing resin sheet carrying apparatus of the present invention, the slider is moved while the sheet holder is used to chuck both the end parts of a carbon fiber-containing resin sheet to apply tension, thereby carrying the resin sheet from the heating furnace to the pressing device. Therefore, appropriate adjustment of tension makes it possible to carry a carbon fiber-containing resin sheet without deformation, and provides good positioning accuracy for feeding to the pressing device. Besides, since it is only necessary to chuck about four points in both the end parts of the carbon fiber-containing resin sheet, almost no part which has conventionally needed to be cut off is generated, thereby improving material yield. Additionally, the claimed apparatus does not require an extra step or auxiliary material as compared with a method comprising laminating a polyimide film on a carbon fiber-containing resin sheet, and thus is economical. The carbon fiber-containing resin sheet carrying apparatus according to the fifth aspect makes it possible to laminate a plurality of carbon fiber-containing resin sheets to provide a press-molded article having a large thickness.

DETAILED DESCRIPTION OF THE INVENTION

Hereinafter, embodiments of the present invention will be described.

Figure 1:
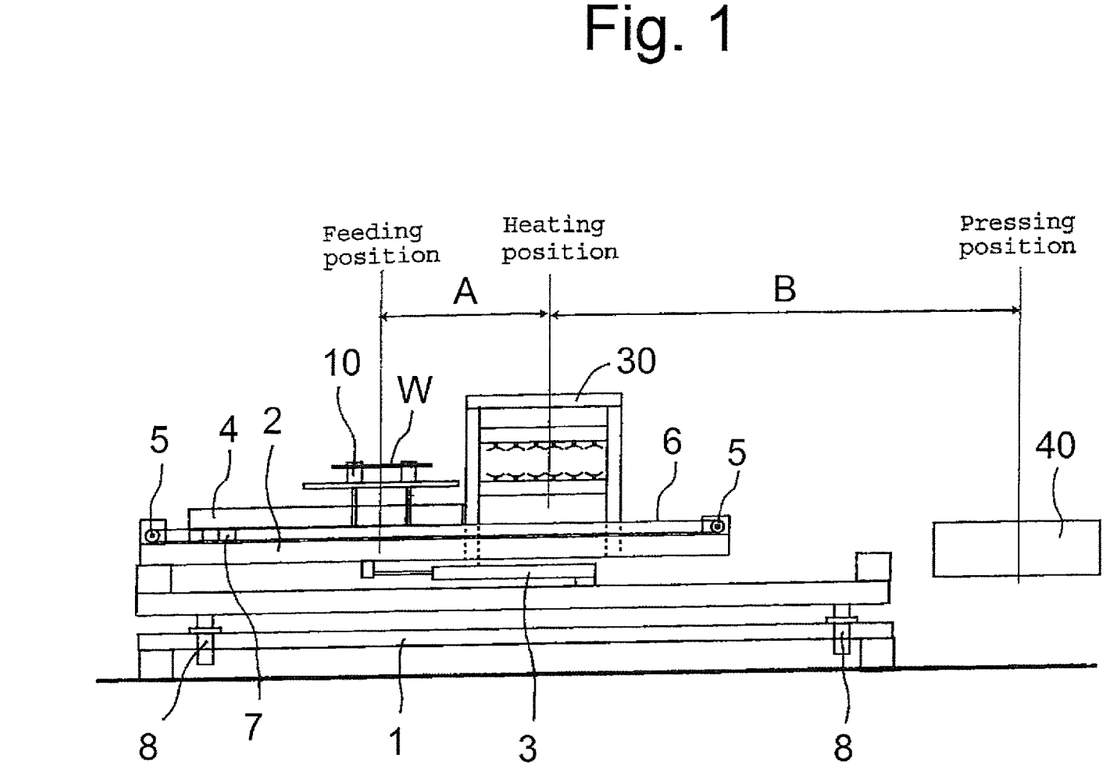
FIG. 1 is an overall side view of an embodiment of the present invention, showing a state where a sheet holder is located in a feeding position.

FIG. 1 is an overall view of a carrying apparatus of an Example. Reference Numeral 1 designates a fixing base, and 2 designates a slide base slidably supported in a horizontal direction above this fixing base 1. The slide base 2 has a structure such that it is supported by a supporting unit such as a linear guide omitted to be shown, and can move, by means of a cylinder 3, by a stroke indicated as A from the position shown in FIG. 1 to the position shown in FIG. 2. In addition, a lifting apparatus 8 such as a cylinder is provided between the fixing base 1 and the slide base 2, and can lift the slide base 2.

A slider 4 is supported by a supporting unit such as a linear guide described below, on the upper surface of this slide base 2. The slide base 2 is provided with an endless belt 6 extended between sprockets 5, 5 positioned on both sides of the slide base 2, and the slider 4 is connected to this endless belt 6 by a connecting tool 7. Therefore, the slider 4 can move on the slide base 2 by running this endless belt 6 omitted to be shown. The movable distance of the slider is shown as B in FIG. 1. As is evident from FIG. 1, the distance between the feeding position and the heating position is defined as A, and the distance from the heating position to the pressing position is defined as B, in this embodiment.

Figure 4:
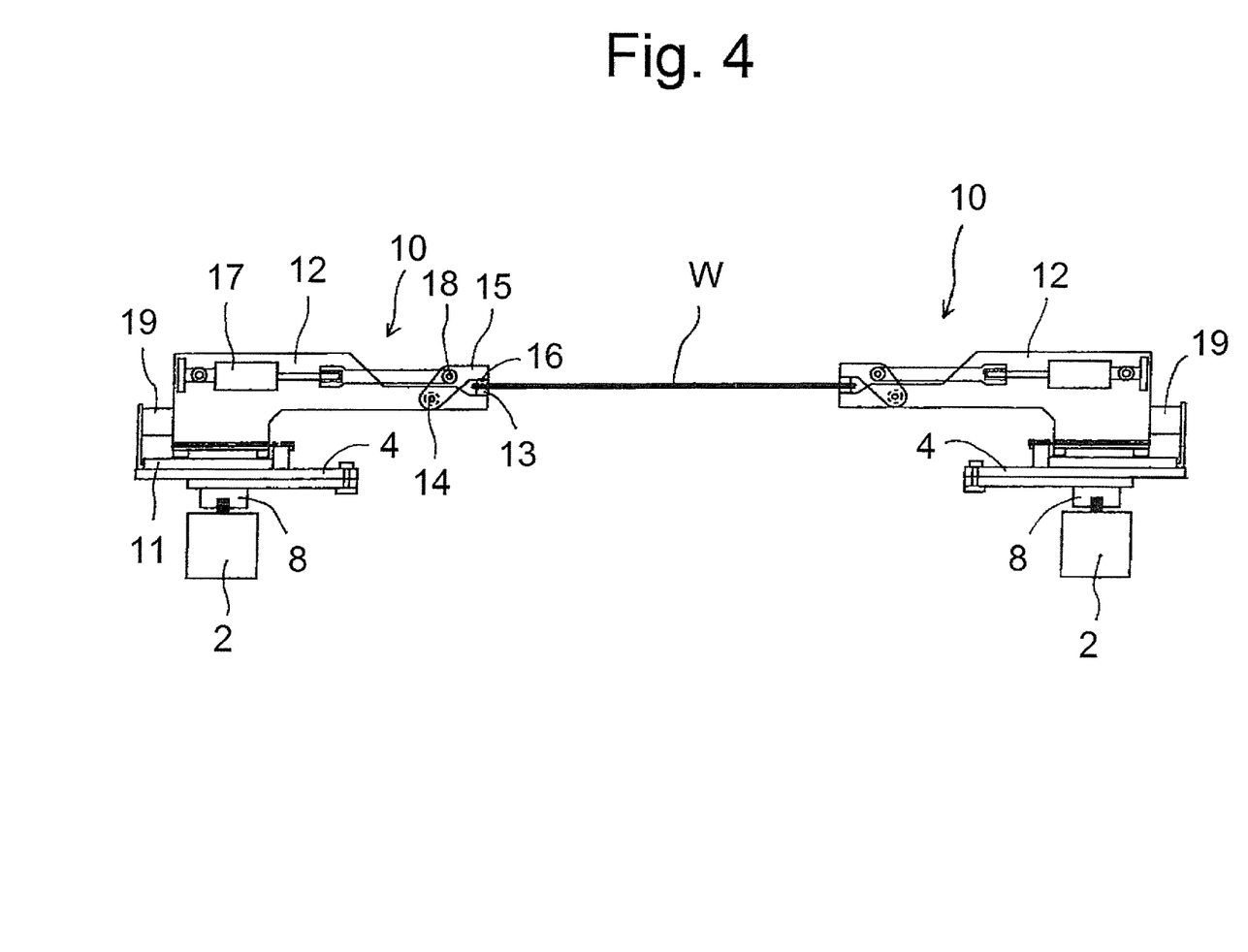
FIG. 4 is an enlarged front view of the sheet holder.
Figure 5:
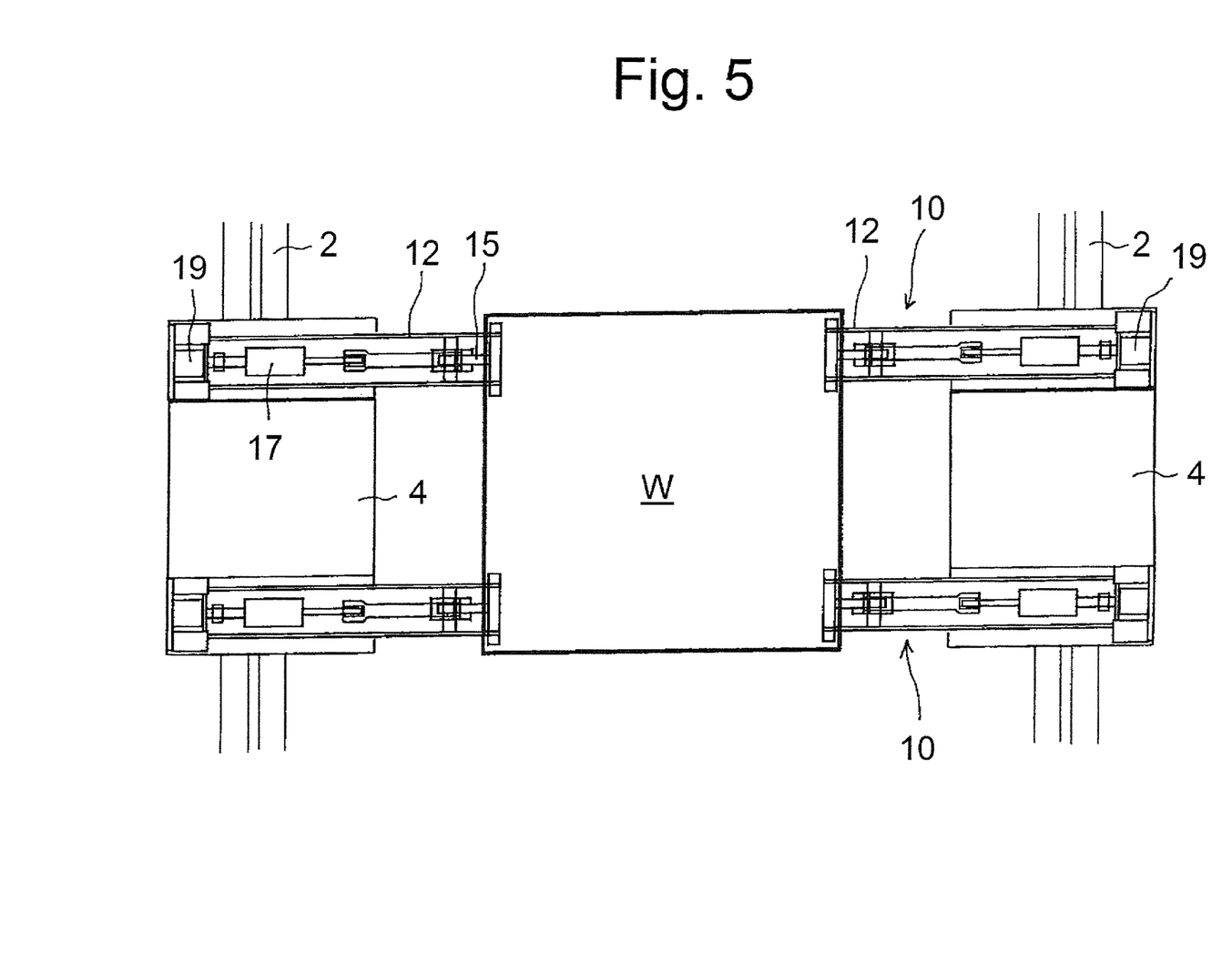
FIG. 5 is an enlarged plan view of the sheet holder.

A sheet holder 10 is mounted in the upper part of the slider 4. Its specific structure will be described below. FIGS. 4 and 5 show a first embodiment of the sheet holder 10, in which the sliders 4 are supported by linear guides 11 above a pair of right and left slide bases 2. This slider 4 runs in a perpendicular direction in FIG. 4 and in a vertical direction in FIG. 5, with respect to the paper face, by means of the above-described endless belt 6. However, the endless belt 6 is omitted in FIG. 4 and FIG. 5.

A short linear guide 11 extending in a horizontal direction is placed on the slider 4, and a box-like chuck base 12 is provided thereon. At a tip end of the chuck base 12, a lower chuck claw 13 is provided. In a somewhat inward position from the tip end, an opening/closing link 15 is pivotally fitted by means of a pin 14, and an upper chuck claw 16 is provided at a tip end of this opening/closing link 15. An opening/closing cylinder 17 is swingably arranged inside the chuck base 12, and a tip end of its rod is connected to an intermediate position of the opening/closing link 15 by means of a pin 18. Therefore, the opening/closing link 15 can be swung around the pin 14 by means of the opening/closing cylinder 17 to open/close the upper chuck claw 16 with respect to the lower chuck claw 13.

Two sheet holder 10 having the above-described structure are provided on the right and left sides, respectively, namely, four are provided in total, as shown in FIG. 5. The sheet holder 10 can chuck both the end parts of a carbon fiber-containing resin sheet W, as shown in FIGS. 4 and 5. Small cylinders, which are tension unit 19, are arranged on the outside of these chuck bases 12, and can move the chuck bases 12 by a small distance on the linear guide 11. Therefore, it is possible to actuate the tension unit 19 to slightly move the chuck bases 12 to the outside, in the state where both end parts of the carbon fiber-containing resin sheet W are chucked as shown in FIGS. 4 and 5, thereby applying tension to the carbon fiber-containing resin sheet W.

Since the carbon fiber-containing resin sheet W is in a square shape, as shown, in many cases, the chuck claws 13, 16 of the sheet holder 10 preferably chuck its four corners to apply tension. The tension can be appropriately determined depending on the characteristics of the carbon fiber-containing resin sheet W and the heating temperature to eliminate sagging due to drawdown, but is defined as not stretching the sheet W. In the meantime, the carbon fiber-containing resin sheet W exhibits relatively small elongation due to tension, by virtue of the reinforcing effect of carbon fibers. In this manner, the slider 4 can be run in the state where tension is applied to the carbon fiber-containing resin sheet W, thereby carrying the sheet W.

Figure 6:
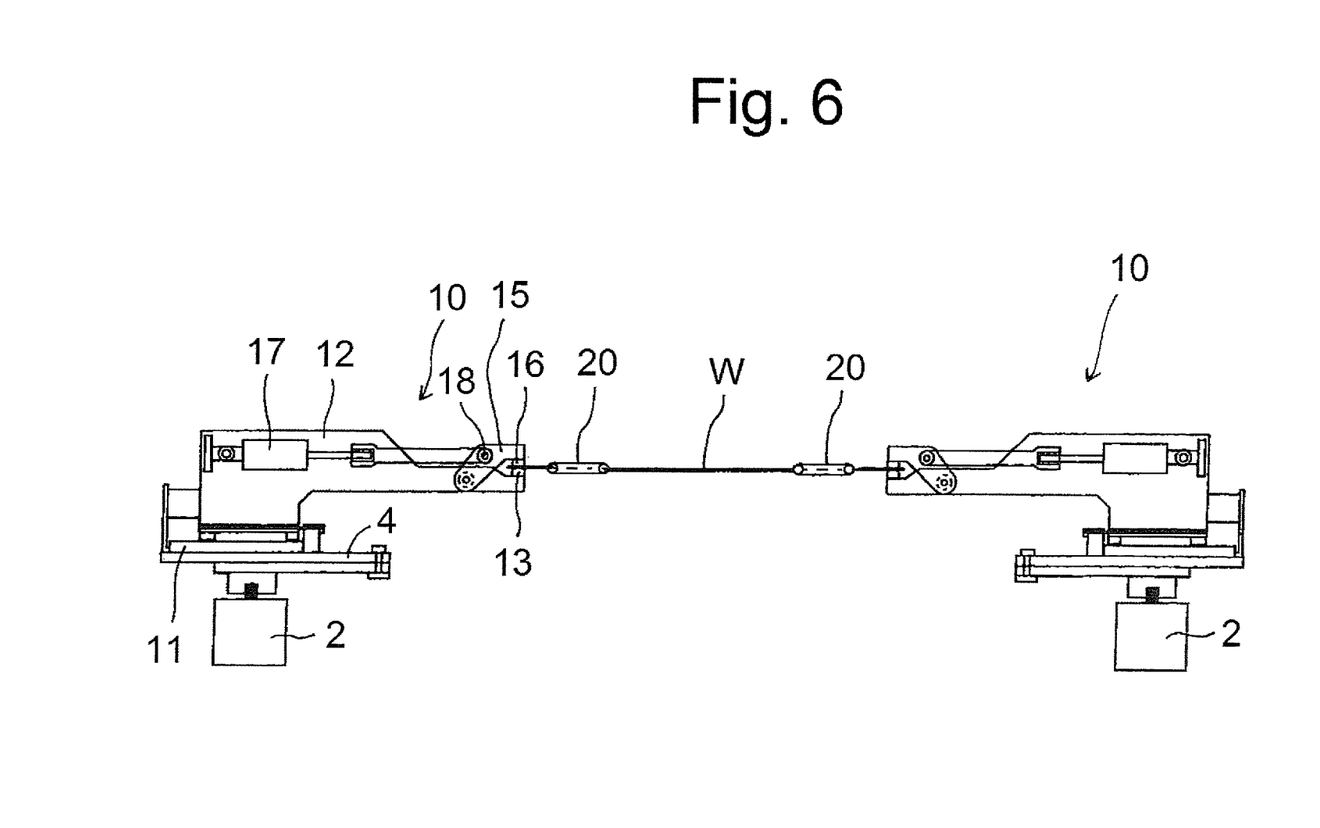
FIG. 6 is an enlarged front view of another sheet holder.
Figure 7:
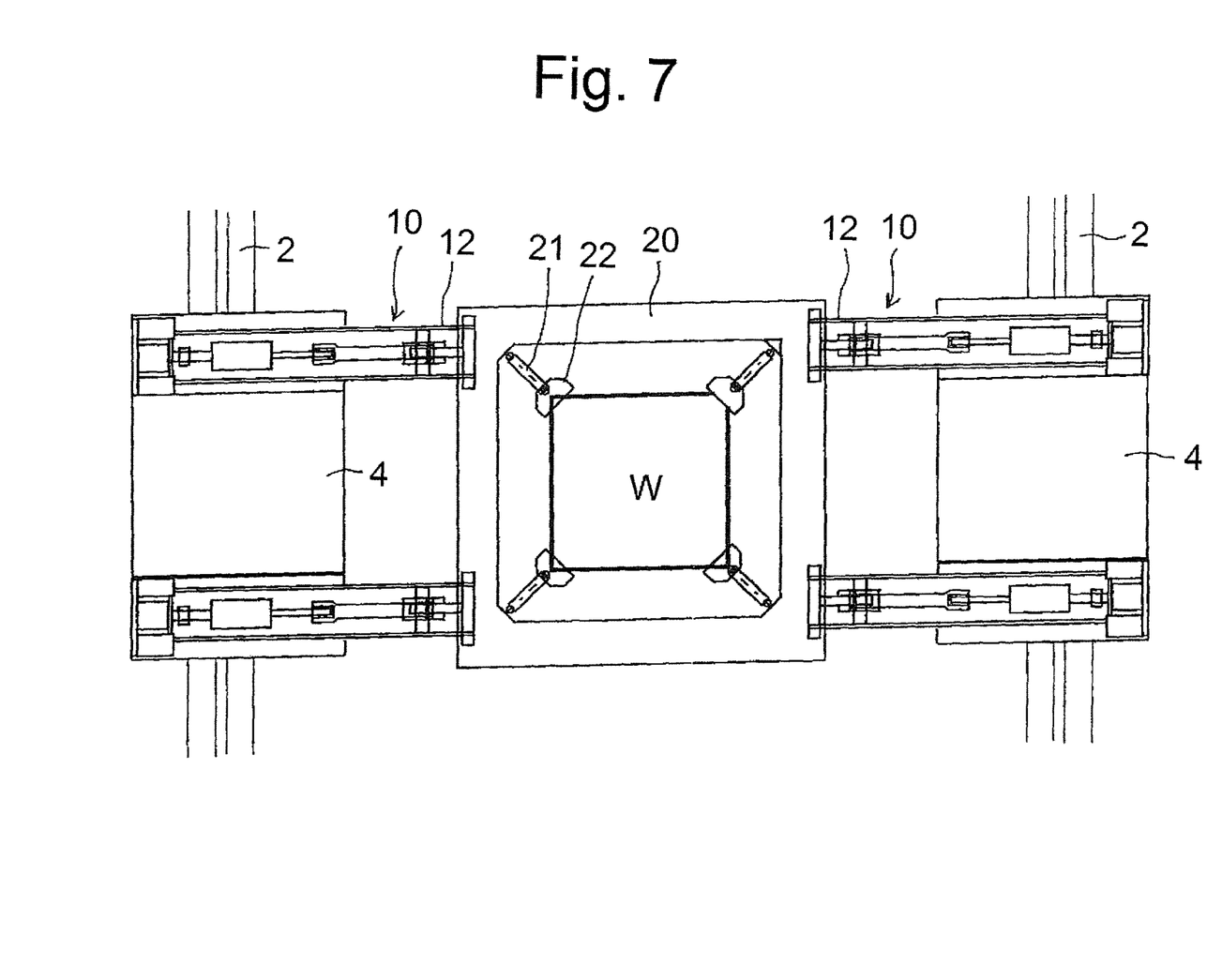
FIG. 7 is an enlarged plan view of another sheet holder.

In the first embodiment as shown in FIGS. 4 and 5 as described above, the chuck claws 13, 16 of the sheet holder 10 directly chuck the end parts of the carbon fiber-containing resin sheet W, but chuck a holding frame 20 in a second embodiment shown in FIGS. 6 and 7. This holding frame 20 is made of a flat metal plate, and holding metal fittings 22 with springs 21 are attached to its four corners. When the end parts of the carbon fiber-containing resin sheet W are chucked by these holding metal fittings 22 as shown in FIG. 7, a predetermined tension can be applied to the carbon fiber-containing resin sheet W by means of the springs 21. Therefore, the springs 21 exert effects similar to those of the tension unit 19 in this second embodiment.

In both the embodiments, the carbon fiber-containing resin sheet W are merely chucked at about four positions in the end parts thereof, so that the conventional formation of many needle holes can be eliminated, thereby imparting material yield. Further, if a heater is incorporated into the chuck claws 13, 16 and holding metal fittings 22, it is also possible to impart, to the chucked parts, thermal history similar to that of other parts.

Figure 2:
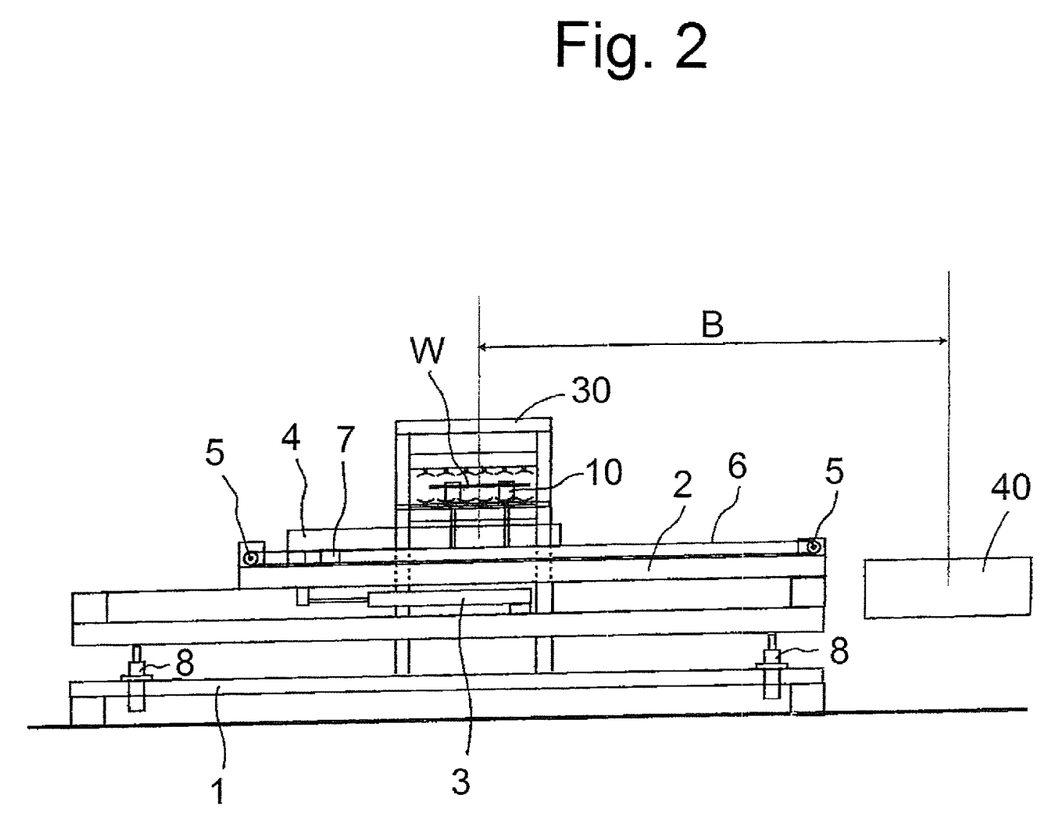
FIG. 2 is an overall side view of an embodiment of the present invention, showing a state where the sheet holder is located in a heating position.
Figure 8:
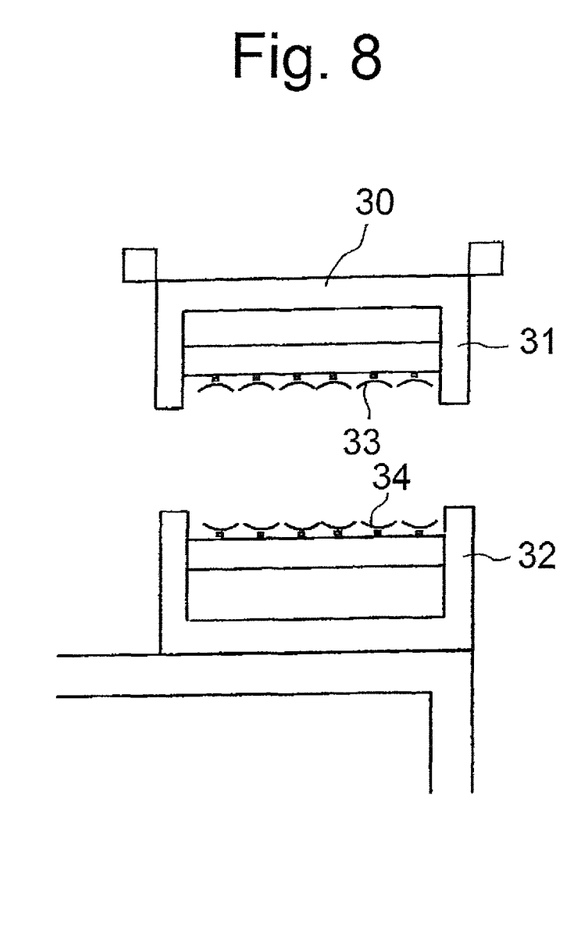
FIG. 8 is a front view of a heating furnace.

Next, the operation of the entire apparatus according to the embodiments will be described with reference to FIGS. 1 to 3. Firstly, as shown in FIG. 1, the carbon fiber-containing resin sheet W is held by the sheet holder 10 when the sheet holder 10 is located in the feeding position. The lifting apparatus 8 has not been operated yet in the state shown in FIG. 1, and the slide base 2 is positioned at a low level. Next, the lifting apparatus 8 is used to elevate the slide base 2, and, at the same time, the cylinder 3 is operated, so that the slide base 2 is moved by a distance A from the position shown in FIG. 1 to the position shown in FIG. 2. Thus, the carbon fiber-containing resin sheet W is carried to the inside of a heating furnace 30 while it is held by the sheet holder 10, as shown in FIG. 2. As shown in FIG. 8, the heating furnace 30 has a structure such that infrared heaters 33, 34 are attached to upper and lower frames 31, 32. This structure can hold the carbon fiber-containing resin sheet W between the infrared heaters 33, 34 for heating purposes while it is held by the sheet holder 10.

Figure 3:
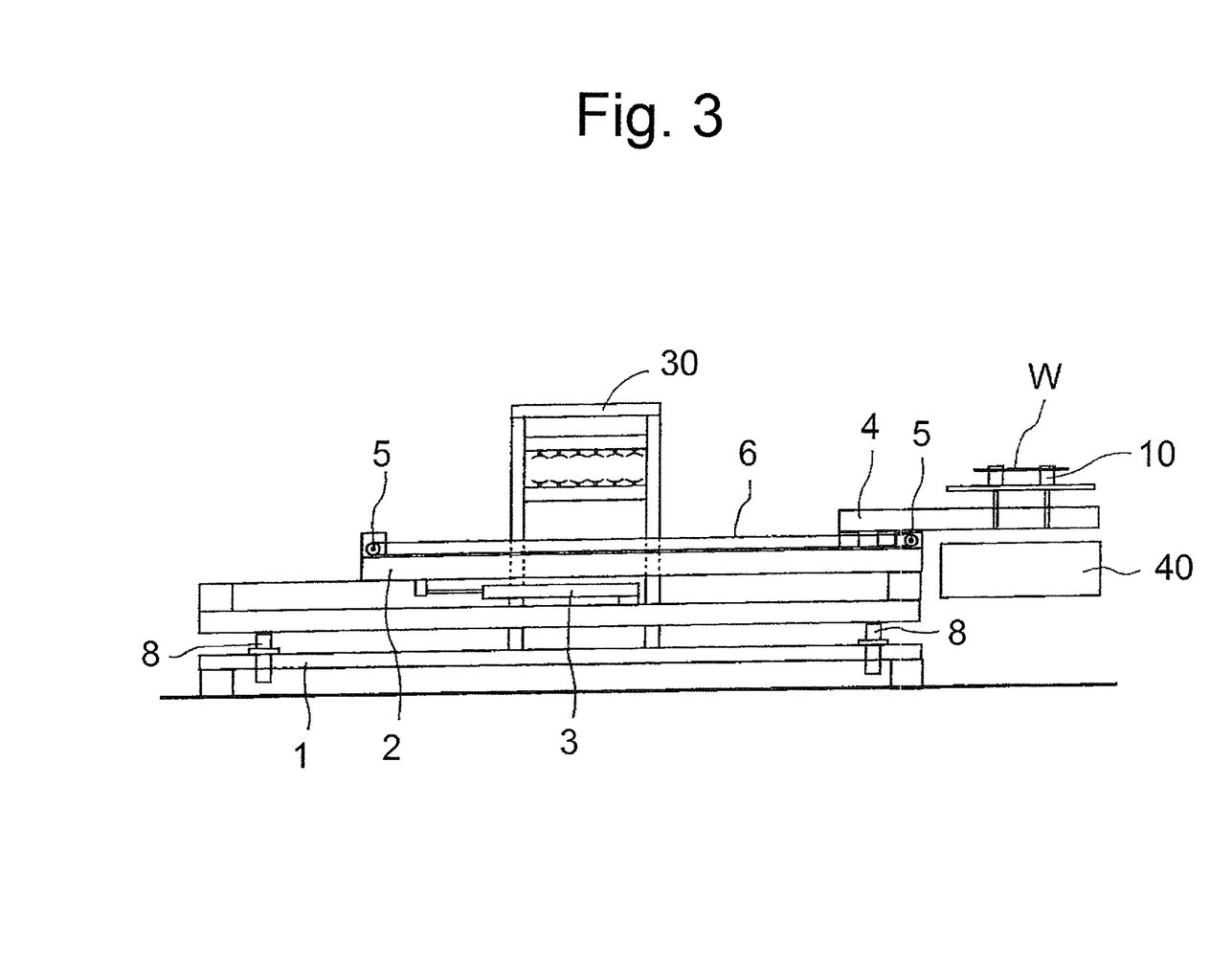
FIG. 3 is an overall side view of an embodiment of the present invention, showing a state where the sheet holder is located in a pressing position.

After heating for a predetermined time, the slide base 2 is moved down by the lifting apparatus 8, and the slider 4 on the upper surface of the slide base 2 is moved by a distance B to the position shown in FIG. 3 by means of the endless belt 6. Thus, the sheet holder 10 moves to the position immediately above the pressing device 40 while holding the carbon fiber-containing resin sheet W, and opens the chuck at that position, thereby feeding the carbon fiber-containing resin sheet W to the pressing device 40. While the carbon fiber-containing resin sheet W is carried from the heating furnace 30 to the pressing device 40, tension is applied thereto. Therefore, no drawdown occurs, thereby making it possible to feed the carbon fiber-containing resin sheet W to the pressing device 40 with high positioning accuracy. Therefore, press-molding with high molding accuracy is feasible. Thereafter, the endless belt 6 is inverted, and the cylinder 3 also operates in an inverse direction, thereby allowing the slider 4 and sheet holder 10 to go back to the position shown in FIG. 1.

Figure 9:
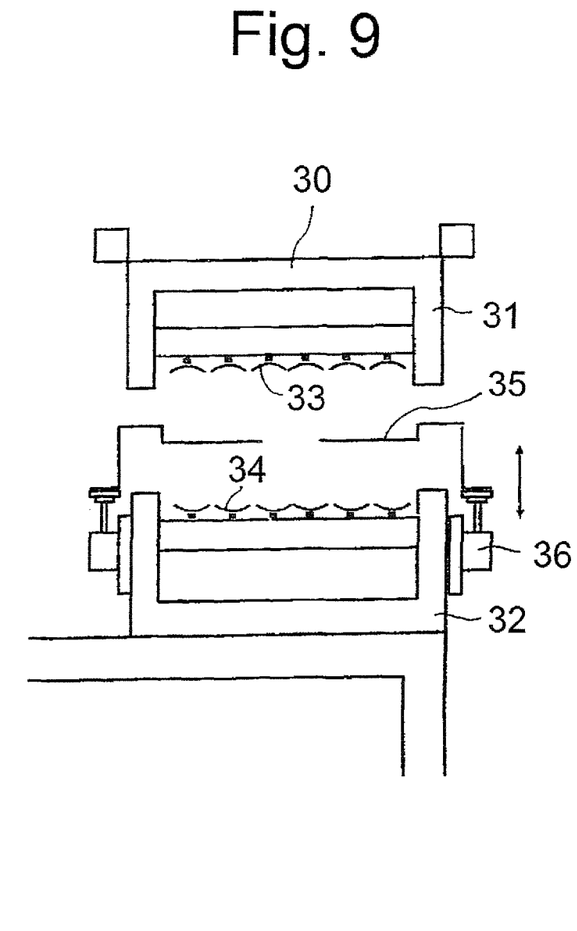
FIG. 9 is a front view of another heating furnace.

While the carbon fiber-containing resin sheet W may be heated while it is held by the sheet holder 10 as described above, the carbon fiber-containing resin sheet W is not at risk of drawdown, and thus does not necessarily have to be held by applied tension. Therefore, it is also possible to provide a sheet holding tool 35 inside the hearting furnace 30 in a manner such that the tool 35 can be elevated/lowered by the cylinder 36, as shown in FIG. 9, and to carry the carbon fiber-containing resin sheet W from the feeding position to this sheet holding tool 35 by use of a common carrier such as a robot. However, the carbon fiber-containing resin sheet W, after heated, is at risk of drawdown, and thus is designed to be carried from the sheet holding tool 35 to the pressing device 40 by the sheet holder 10 provided with the tension unit according to the present invention.

Next, the second embodiment corresponding to the fifth aspect will be described with reference to FIG. 10 and the subsequent figures.

In the second embodiment, two carbon fiber-containing resin sheets W can be laminated to obtain a press-molded article having a large thickness.

Figure 10:
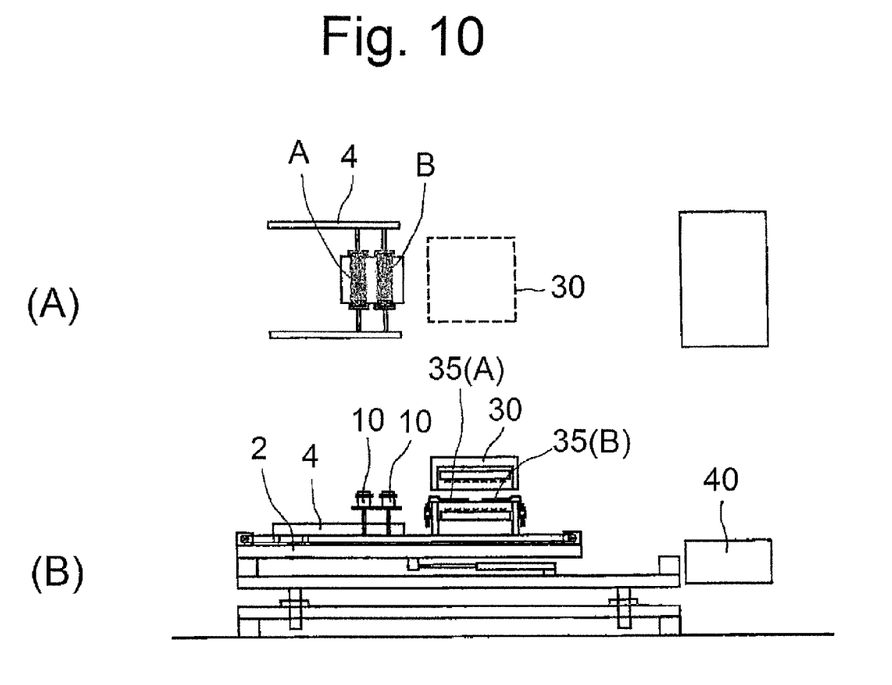
FIG. 10 is a view for explaining the steps of a second embodiment, in which (A) is a plan view of the main part thereof, and (B) is a front view thereof.

A pair of sheet holders 10 is provided on the slider 4, as shown in FIG. 10. In the following explanation, the respective sheet holders 10 are referred to as chucks A and B. The respective carbon fiber-containing resin sheets W corresponding to the chucks A and B are referred to as works A and B. The chucks A and B have the function of chucking both the end parts of the carbon fiber-containing resin sheets W to apply tension.

Figure 11:
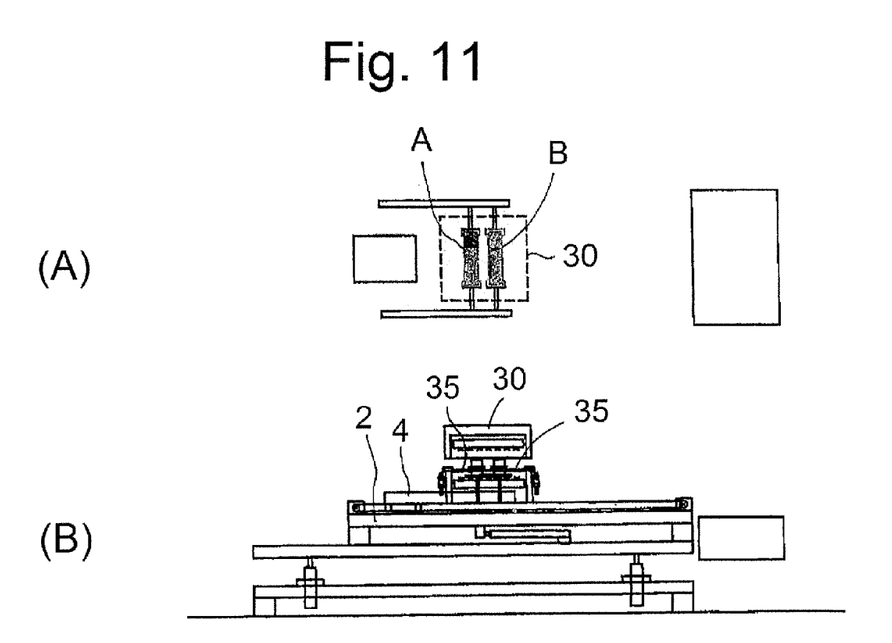
FIG. 11 is a view for explaining the steps of the second embodiment, in which (A) is a plan view of the main part thereof, and (B) is a front view thereof.
Figure 12:
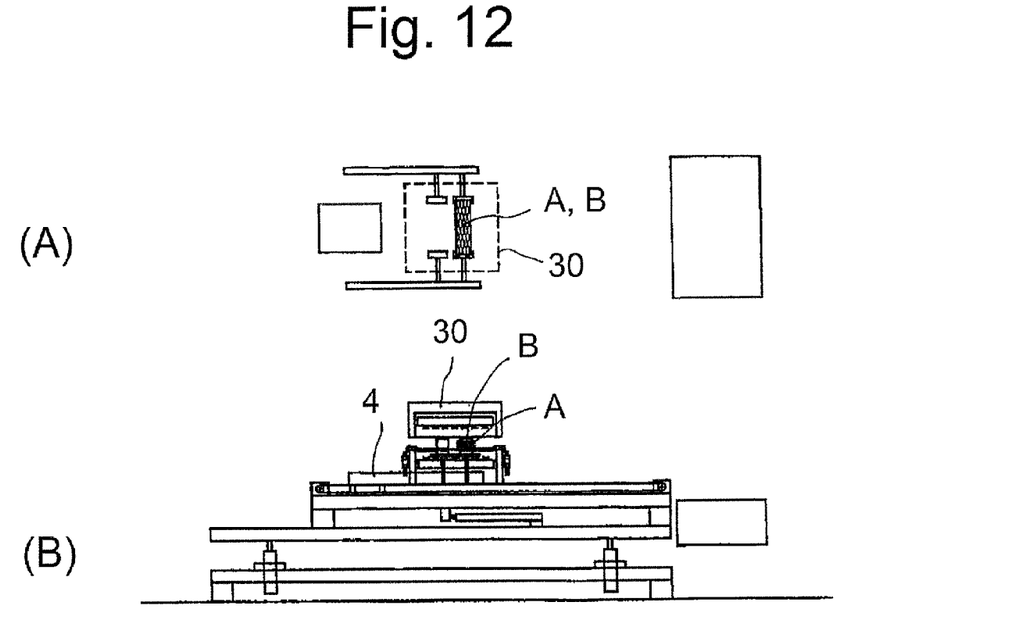
FIG. 12 is a view for explaining the steps of the second embodiment, in which (A) is a plan view of the main part thereof, and (B) is a front view thereof.

Firstly, the works A and B, which are carbon fiber-containing resin sheets W, are chucked by the chucks A and B, respectively, as shown in FIG. 10. In this state, the works A and B are run on the slide base 2 to be moved to the inside of the heating furnace 30 as shown in FIG. 11, and then placed on the sheet holding tools 35. The sheet holding tools 35 are referred to as work stands A and B. The works A and B are placed on the work stands A and B, respectively, and thereafter chucks A and B stand by within the heating furnace 30.

Figure 13:
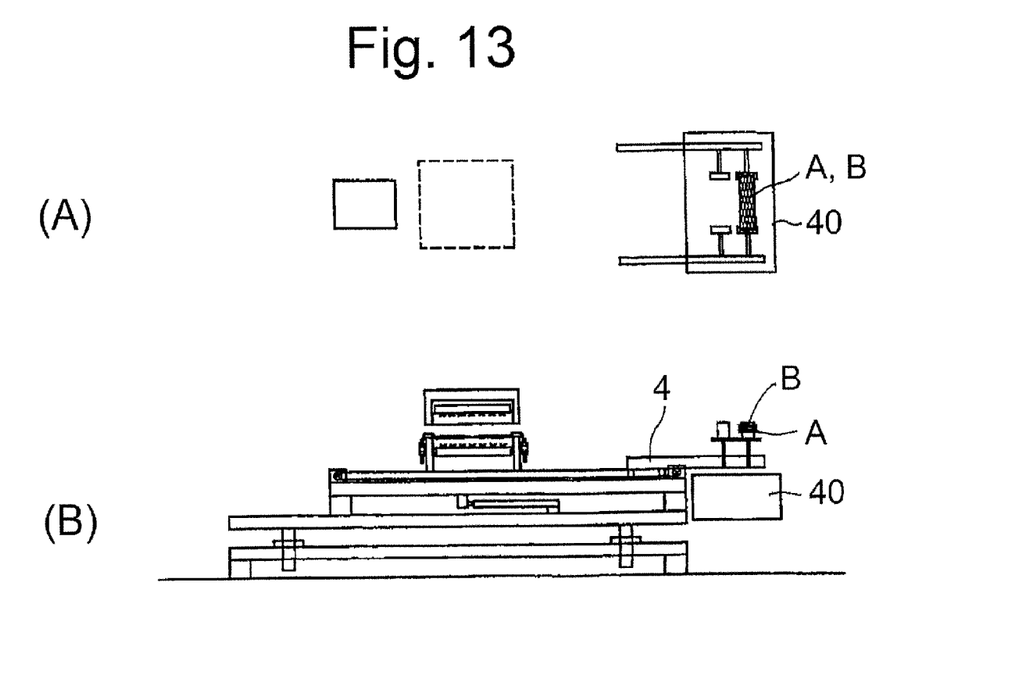
FIG. 13 is a view for explaining the steps of the second embodiment, in which (A) is a plan view of the main part thereof, and (B) is a front view thereof.

After heating for a certain time, the chuck B is opened, and, at the same time, the work stand B is elevated, and the work B is chucked. The chuck B is moved in the furnace to laminate the work B on the work A. Next, the laminated two works A and B are chucked by the chuck A, and the slider 4 is run to feed the works to the pressing device 40, as shown in FIG. 13. The pressing device 40 presses the laminated two works A and B to mold a press-molded article having a twofold thickness.

Figure 14:
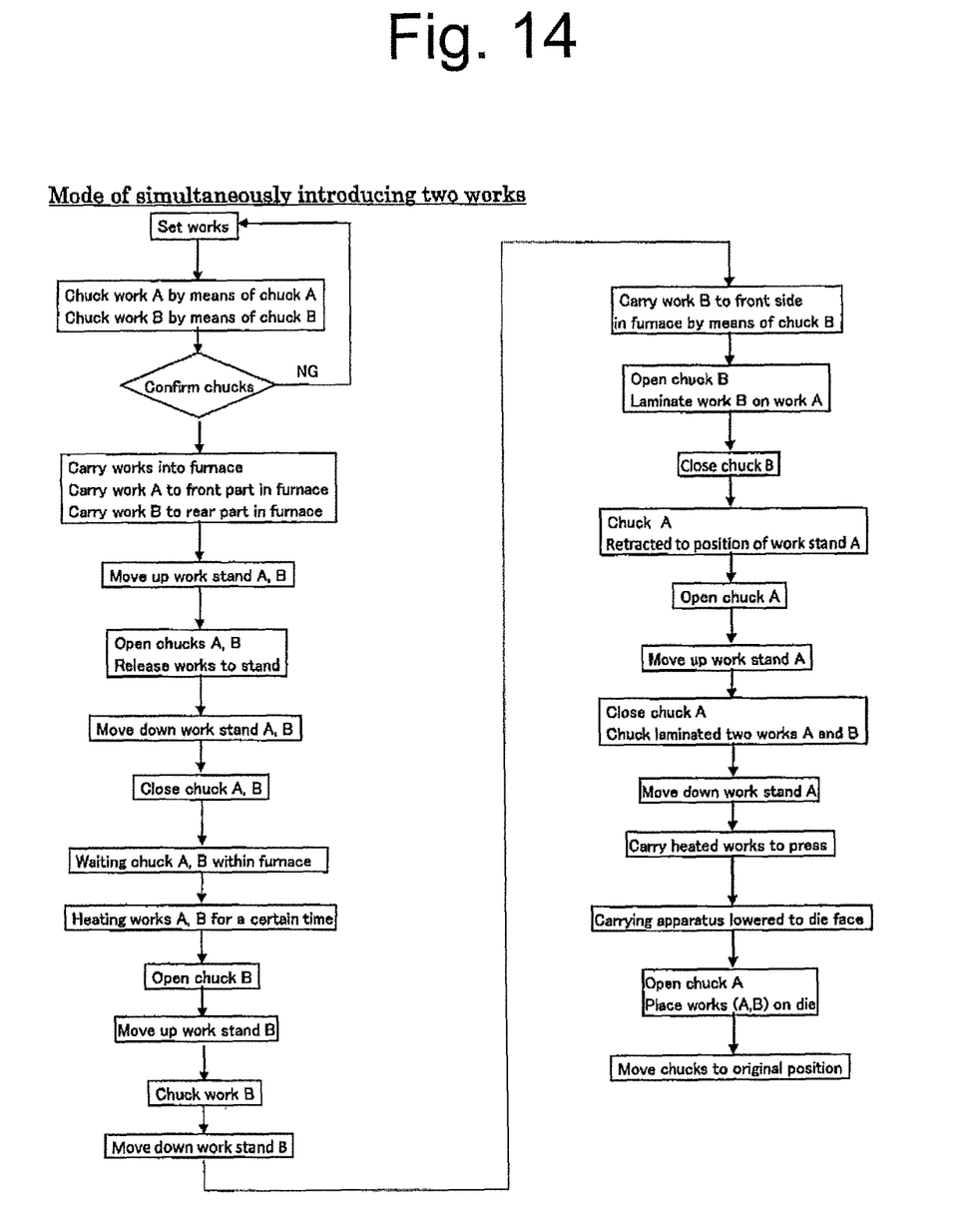
FIG. 14 is a flow sheet of the second embodiment.

The steps described above are modes of introducing the works A and B into the heating furnace 30 at the same time, and the flow thereof is shown in FIG. 14. However, it is also possible to introduce the works A and B into the heating furnace 30 with a temporal difference as indicated in the flow sheet in FIG. 15.

Figure 15:
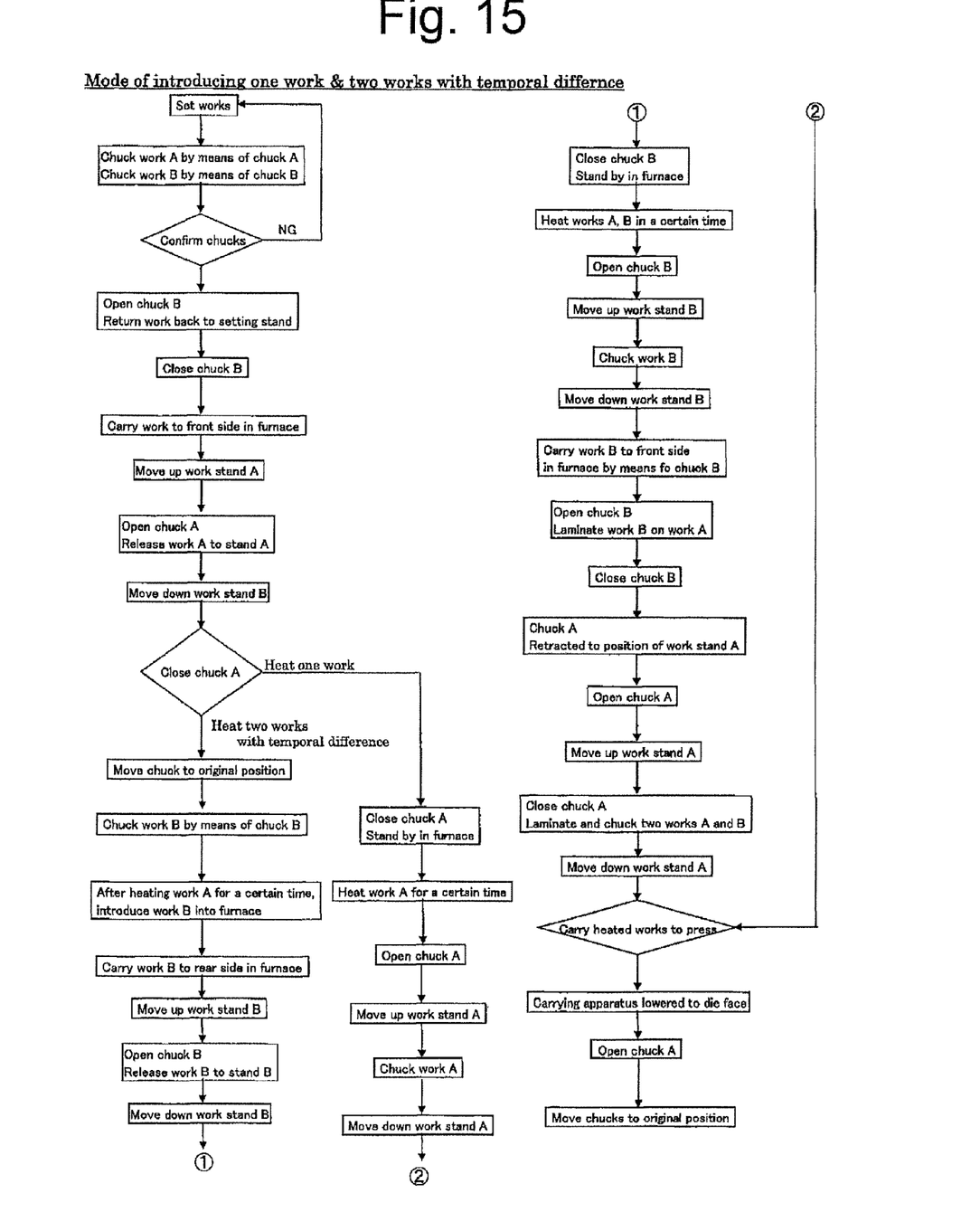
FIG. 15 is another flow sheet of the second embodiment.

In this context, when the two works are heated with a temporal difference, the work A is firstly carried to the heating furnace 30 by means of the chuck A to be heated for a certain time, and, thereafter the work B is carried to the heating furnace 30 by means of the chuck B to be heated as shown in FIG. 15 (1). Then, the work B is carried in the furnace by means of the chuck B to be laminated on the work A, and the work laminate is fed to the pressing device 40 for pressing in the same manner as described above, to mold a press-molded article having a twofold thickness. It is, of course, to heat only one work, as shown in FIG. 15 (2).

As described above, the carbon fiber-containing resin sheet carrying apparatus of the present invention can carry a carbon fiber-containing resin sheet W heated and softened in the heating furnace 30 to the pressing device 40 with high positioning accuracy. There are great advantages of good material yield since it is only necessary to chuck the four corners of the carbon fiber-containing resin sheet W, and of excellent economical efficiency since no auxiliary material is needed. The press-molded carbon fiber-containing resin sheet W is light in weight and has high strength, and thus is used as an automobile or airplane part.

The invention claimed is:

1. A carbon fiber-containing resin sheet carrying apparatus that carries a carbon fiber-containing resin sheet heated in a heating furnace to a pressing device, the apparatus comprising:
    a slider that moves between the heating furnace and the pressing device, and is installed on a structure that moves in a vertical direction to lift or lower the slider; and
    a sheet holder that is mounted on the slider, and having a chuck structure comprising a tension unit and a linear guide at each chuck claw, with the linear guide supporting the chuck claw and having a structure that slides horizontally so as to chuck both end parts of the carbon fiber-containing resin sheet to apply tension.

2. The carbon fiber-containing resin sheet carrying apparatus according to claim 1, wherein the sheet holder comprises:
    chuck claws that directly chuck both the end parts of the carbon fiber-containing resin sheet; and
    the tension unit that displaces the chuck claws to the outside.

3. The carbon fiber-containing resin sheet carrying apparatus according to claim 1, wherein the sheet holder comprises:
    a holding metal fitting with a spring, that is arranged inside a holding frame; and
    a chuck claw that chucks the holding frame.

4. The carbon fiber-containing resin sheet carrying apparatus according to claim 1, wherein the carbon fiber-containing resin sheet is in a square shape, and wherein the sheet holder chucks the four corners of the sheet to apply tension.

5. The carbon fiber-containing resin sheet carrying apparatus according to claim 1, wherein a plurality of sheet holders is provided on the slider to provide the function of laminating carbon fiber-containing resin sheets within the heating furnace.

\* \* \* \* \*